United States Patent
Endo

(10) Patent No.: US 12,039,956 B2
(45) Date of Patent: *Jul. 16, 2024

(54) SEMICONDUCTOR DEVICE FOR DETECTING VISIBILITY OF DISPLAYED OSD CHARACTERS

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 38 days.

This patent is subject to a terminal disclaimer.

(21) Appl. No.: 17/489,256

(22) Filed: Sep. 29, 2021

(65) Prior Publication Data

US 2022/0020342 A1    Jan. 20, 2022

Related U.S. Application Data

(63) Continuation of application No. PCT/JP2020/013320, filed on Mar. 25, 2020.

(30) Foreign Application Priority Data

Mar. 29, 2019   (JP) .................... 2019-066724

(51) Int. Cl.
| | |
|---|---|
| G09G 5/38 | (2006.01) |
| G09G 5/377 | (2006.01) |
| H04N 5/66 | (2006.01) |
| G06T 11/60 | (2006.01) |
| G09G 5/397 | (2006.01) |

(52) U.S. Cl.
CPC ......... *G09G 5/38* (2013.01); *G09G 5/377* (2013.01); *H04N 5/66* (2013.01); *G06T 11/60* (2013.01); *G09G 5/397* (2013.01); *G09G 2340/10* (2013.01)

(58) Field of Classification Search
None
See application file for complete search history.

(56) References Cited

U.S. PATENT DOCUMENTS 7,057,595 B1* 6/2006 Benyoub ............ G06V 10/28
                                                                        382/237
7,667,734 B2* 2/2010 Uehara ............ H04N 17/045
                                                                        348/184
(Continued)

FOREIGN PATENT DOCUMENTS

JP    H06317782 A    11/1994
JP    2002169524 A    6/2002
(Continued)

OTHER PUBLICATIONS

Peli E., 'Contrast in complex images', J. Opt. Soc. Am., 7(10). (Year: 1990).*

(Continued)

*Primary Examiner* — Patrick F Valdez
(74) *Attorney, Agent, or Firm* — CANTOR COLBURN LLP

(57) ABSTRACT

A video input interface receives video data. An OSD circuit draws an on screen display (OSD) character on the video data. The visibility detector checks whether the visibility of the OSD character is good or poor. A determination criterion for the visibility dynamically changes in a manner that depends on a background of the OSD character.

11 Claims, 8 Drawing Sheets

(56) References Cited

U.S. PATENT DOCUMENTS

| | | | |
|---|---|---|---|
| 10,769,827 B1* | 9/2020 | Amerige | G06V 10/56 |
| 2005/0212824 A1* | 9/2005 | Marcinkiewicz | G09G 3/3406 |
| | | | 345/690 |
| 2007/0077987 A1* | 4/2007 | Gururajan | G07F 17/322 |
| | | | 463/22 |
| 2008/0181496 A1* | 7/2008 | Ferman | G06V 30/18105 |
| | | | 382/168 |
| 2011/0164045 A1 | 7/2011 | Costa et al. | |
| 2012/0144181 A1* | 6/2012 | Lin | G06F 9/4401 |
| | | | 713/2 |
| 2012/0288197 A1* | 11/2012 | Adachi | H04N 21/4854 |
| | | | 382/167 |
| 2016/0093080 A1* | 3/2016 | Tumanov | G06T 11/60 |
| | | | 345/589 |
| 2017/0054939 A1 | 2/2017 | Liu | |
| 2019/0213071 A1* | 7/2019 | Anand | G06F 11/1004 |

FOREIGN PATENT DOCUMENTS

| | | | |
|---|---|---|---|
| JP | 2004135009 A | | 4/2004 |
| JP | 2008197300 A | | 8/2008 |
| JP | 2012133195 A | * | 7/2012 |
| JP | 2013025077 A | | 2/2013 |
| JP | 2013516696 A | | 5/2013 |
| JP | 2013109180 A | | 6/2013 |
| JP | 2013182119 A | | 9/2013 |
| JP | 2018132648 A | * | 8/2018 |
| JP | 2003131656 A | | 5/2023 |

OTHER PUBLICATIONS

Pelli et al.('Measuring contrast sensitivity', PMC, pp. 1-10. (Year: 2014).*
PCT International Preliminary Report of Patentability with Written Opinion of the International Searching Authority for International Application No. PCT/JP2020/013320; Date of Mailing, Oct. 14, 2021.
International Search Report for International Application No. PCT/JP2020/013320; Date of Mailing, Jun. 23, 2020.
IPO Notice of Reasons for Refusal for corresponding JP Application No. 2021-511866; Issued on Jul. 5, 2022.
CNIPA First Office Action for corresponding CN Application No. 202080025788.5; Issued on Aug. 1, 2023.

* cited by examiner

SEMICONDUCTOR DEVICE FOR DETECTING VISIBILITY OF DISPLAYED OSD CHARACTERS

CROSS REFERENCE TO RELATED APPLICATIONS

This application is a continuation under 35 U.S.C. § 120 of PCT/JP2020/013320, filed Mar. 25, 2020, which is incorporated herein reference and which claimed priority to Japanese Application No. 2019-066724, filed Mar. 29, 2019. The present application likewise claims priority under 35 U.S.C. § 119 to Japanese Application No. 2019-066724, filed Mar. 29, 2019, the entire content of which is also incorporated herein by reference.

BACKGROUND

1. Technical Field

The present disclosure relates to a semiconductor device having an interface for digital video signals.

2. Related Art

FIG. 1 is a block diagram of an image display system. An image display system 100R includes a display panel 102 such as a liquid crystal panel or an organic EL panel, a gate driver 104, a source driver 106, a graphic controller 110, and a timing controller 200R. The graphic controller 110 generates image data to be displayed on the display panel 102. Pixel (RGB) data included in the image data is transmitted to the timing controller 200R in a serial format.

The timing controller 200R receives the image data and generates various control/synchronization signals. The gate driver 104 sequentially selects a scan line Ls of the display panel 102 in synchronization with a signal from the timing controller 200R. Further, the RGB data is fed to the source driver 106.

The timing controller 200R includes a reception circuit 202, a transmission circuit 204, and a logic circuit 210. The reception circuit 202 receives the image data in a serial format from the graphic controller 110. An external ROM 111 stores an ID (identification information), resolution, refresh rate, and the like of the display panel 102. The logic circuit 210 generates the control/synchronization signal based on the image data received by the reception circuit 202. The transmission circuit 204 outputs the control signal or the image data to the gate driver 104 and the source driver 106.

The timing controller 200R may be required to have an on screen display (OSD) function of displaying a predetermined character, figure, icon, or the like separately from the image data received by the reception circuit 202. This requires that the logic circuit 210 be provided with an OSD circuit 212. Hereinafter, characters, figures, icons, and the like are collectively referred to as OSD characters.

The ROM 111 stores bitmap data of several OSD characters. The timing controller 200R reads, from the ROM 111, the bitmap data of an OSD character in accordance with the control signal input separately from the image data, and displays the bitmap data on the display panel 102.

FIG. 2A is a diagram illustrating an example of the OSD character, and FIG. 2B is a diagram illustrating a state where the OSD character overlays image data. As illustrated in FIG. 2B, the visibility of the OSD character may be significantly lowered in a manner that depends on a relationship between the color and brightness of the OSD character and the color and brightness of the image data serving as a background.

In order to solve such a problem, a visibility detection function may be implemented in the timing controller. The visibility detection function is a function of determining the visibility of the OSD character by comparing a difference in color or brightness between the OSD character and the background with a threshold. A result of the determination is notified to the graphic controller 110, and the graphic controller 110 takes measures when the visibility is low.

As a result of studying the visibility detection, the present inventor has found the following problems. In the conventional visibility detection, there is a case where a situation that should be easily recognized is erroneously determined to have poor visibility, or a situation that should be difficult to be recognized is erroneously determined to have good visibility.

SUMMARY

The present disclosure has been made in view of such a circumstance.

One embodiment of the present disclosure relates to a semiconductor device. The semiconductor device includes a video input interface structured to receive video data, an on screen display (OSD) circuit structured to draw an OSD character on the video data, and a visibility detector structured to check whether visibility of the OSD character is good or poor. A determination criterion (determination condition) for the visibility dynamically changes in a manner that depends on a background of the OSD character.

Note that any combination of the above-described components, or an entity that results from replacing expressions of the present disclosure among a method, an apparatus, and the like is also valid as an embodiment of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Summary of Embodiment

Figure 1:
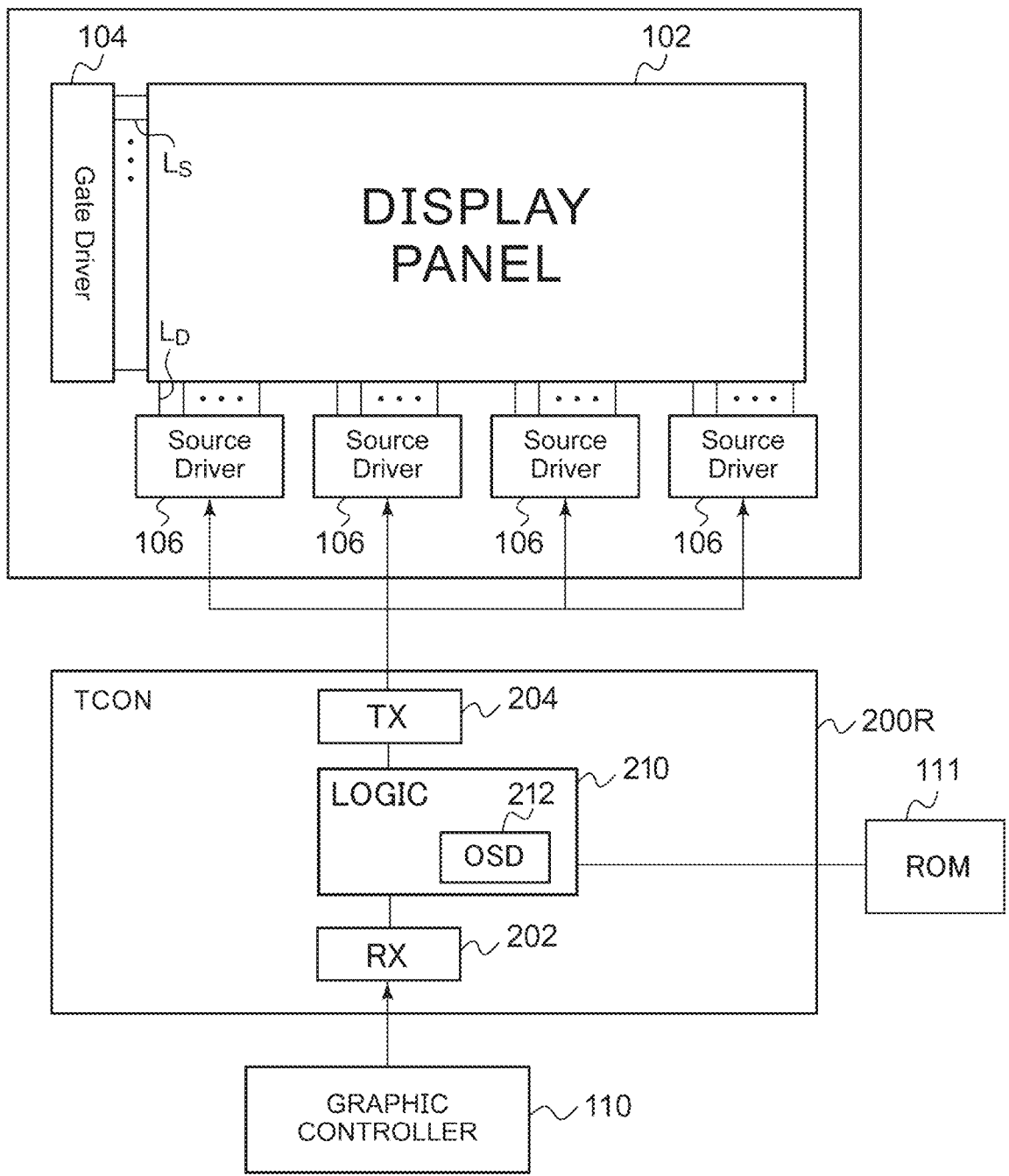
FIG. 1 is a block diagram of an image display system.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed herein relates to a semiconductor device. The semiconductor device includes a video input interface structured to receive video data, an on screen display (OSD) circuit structured to draw an OSD character on the video data, and a visibility detector structured to check whether visibility of the OSD character is good or poor. A determination criterion for the visibility dynamically changes in a manner that depends on a background of the OSD character.

As a result of studying the conventional visibility detection, the present inventor has found that one of the factors in erroneous determination is that a fixed determination criterion is used regardless of the state of the background. It is possible to make visibility detection close to human senses by dynamically changing, based on the perception described above, the determination criterion in a manner that depends on the background.

In one embodiment, the visibility detector may be structured to determine whether the visibility is good or poor for each of a plurality of pixels lying within a target region where the OSD character is drawn, and when the number of pixels having poor visibility exceeds a pixel count threshold, the visibility of the OSD character may be determined to be poor.

In one embodiment, the determination criterion of the visibility for each pixel may change in a manner that depends on a color of the pixel.

In one embodiment, the closer the color of the pixel is to black, the less strict the determination criterion for the visibility for each pixel. With a pixel value of each pixel denoted as R, G, B, and the threshold denoted as T, when R>T, G>T, and B>T are satisfied, the pixel may be determined to be close to black.

In one embodiment, the lower brightness or luminance of the pixel, the less strict the determination criterion for the visibility for each pixel.

In one embodiment, the visibility of each pixel lying within the target region may be determined to be good when a color difference between the pixel and a reference color is greater than a color difference threshold and a brightness difference between the pixel and the reference color is greater than a brightness difference threshold, and at least either the color difference threshold or the brightness difference threshold may change in a manner that depends on the background. The reference color may be the same color as or different from the color of the OSD character.

In one embodiment, the pixel count threshold may change in a manner that depends on the background.

In one embodiment, the determination criterion for the visibility may dynamically change in a manner that depends on a spatial frequency of the target region.

EMBODIMENT

Hereinafter, the present disclosure will be described based on preferred embodiments with reference to the drawings. The same or equivalent components, members, and processes shown in the drawings are denoted by the same reference numerals, and redundant description will be omitted as needed. Further, the embodiments are not intended to limit the disclosure but are merely given as examples, and all features described in the embodiments and combinations of the features are not necessarily essential to the disclosure.

Herein, "A state where a member A is connected to a member B" includes not only a state where the member A and the member B are physically and directly connected to each other, but also a state where the member A and the member B are indirectly connected to each other via another member that has no substantial effect on an electrical connection state between the member A and the member B or that does not impair a function or effect produced by the connection between the member A and the member B.

Likewise, "A state where a member C is provided between the member A and the member B" includes not only a state where the member A and the member C, or the member B and the member C are directly connected to each other, but also a state where the members are indirectly connected via another member that has no substantial effect on an electrical connection state between the members or that does not impair a function or effect produced by the connection between the members.

Figure 3:
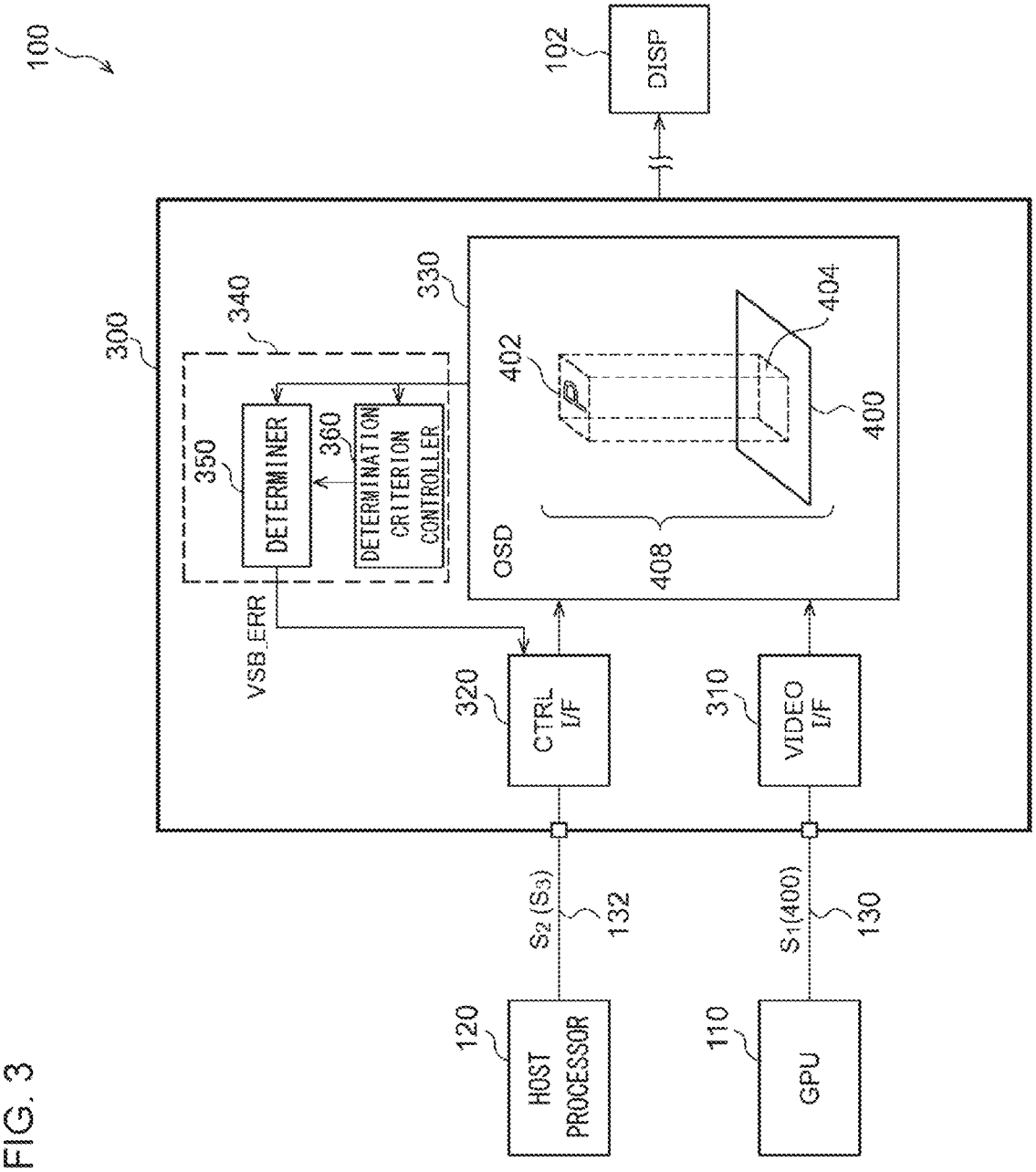
FIG. 3 is a block diagram of an image display system including a semiconductor device according to an embodiment.

FIG. 3 is a block diagram of an image display system 100 including a semiconductor device 300 according to the embodiment. The image display system 100 includes the semiconductor device 300, a display panel 102, a graphic controller 110, and a host processor 120.

The graphic controller 110 is a graphics processing unit (GPU) or the like, and generates video data 400. The graphic controller 110 includes a transmitter (video output interface) conforming to HDMI (registered trademark) standard, DisplayPort standard, or Digital Visual Interface (DVI) standard, and is connected to the semiconductor device 300 over a video transmission line 130. A digital video signal $S_1$ including the video data 400 is transmitted to the semiconductor device 300 in a serial format.

The host processor 120 controls the image display system 100 in a centralized manner. The host processor 120 and the semiconductor device 300 are connected over a control line 132 provided separately from the video transmission line 130. The I²C interface or SPI is applicable to the control line 132. The graphic controller 110 and the host processor 120 may be unified.

The semiconductor device 300 includes a video input interface 310, a control input interface 320, an OSD circuit 330, and a visibility detector 340. The video input interface 310 receives the digital video signal $S_1$ from the graphic controller 110.

The control input interface 320 receives control data $S_2$ related to the OSD from the host processor 120. For example, the control data $S_2$ includes a display command $S_3$ for displaying the OSD character 402.

The OSD circuit 330 loads data of the OSD character 402 corresponding to the display command $S_3$ from a memory (not illustrated). The memory may store the data of the OSD character in a compressed format, and in this case, the OSD circuit 330 decodes the OSD character.

The OSD circuit 330 overlays the OSD character 402 on a target region 404 on the video data 400. The region 404 serves as a background of the OSD character 402, and is therefore referred to as a target region. The OSD character 402 includes opaque effective pixels and transparent ineffective pixels. The OSD circuit 330 overwrites, with the opaque pixels, corresponding pixels of the video data and maintains the original video data for the transparent pixels.

Image data 408 overlaid with the OSD character 402 is transmitted to a driver (not illustrated) and is finally displayed on the display panel 102.

The visibility detector 340 checks whether the visibility of the OSD character 402 is good or poor. A result of the determination made by the visibility detector 340 is notified to the host processor 120 via the control input interface 320. The host processor 120 may perform error processing of, for example, changing the color of the OSD character.

The determination criterion for visibility used by the visibility detector 340 dynamically changes in a manner that depends on the target region 404 serving as the background of the OSD character 402. The visibility detector 340 includes a determiner 350 and a determination criterion controller 380. The determiner 350 determines, based on information So on the OSD character 402 and information Sb on the target region 404, whether the visibility is good or poor in accordance with a predetermined determination criterion. The determination criterion controller 380 dynamically controls the determination criterion used by the determiner 350 based on the information Sb on target region 404. For example, one or a plurality of determination thresholds may be set in the determiner 350, and the determination criterion controller 380 may adjust the determination threshold.

The above has described the basic configuration of the semiconductor device 300. According to the semiconductor device 300, dynamically changing the determination criterion for visibility in a manner that depends on the background allows visibility detection more suitable for human visual characteristics.

Figure 2A:
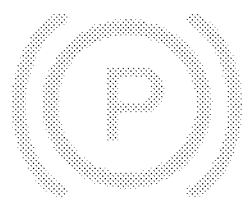
FIG. 2A is a diagram illustrating an example of an OSD character.
Figure 2B:
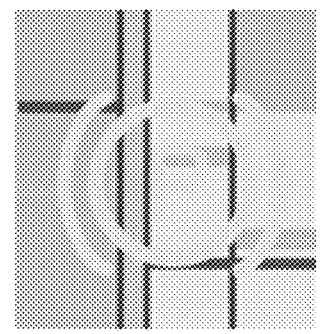
FIG. 2B is a diagram illustrating a state where the OSD character overlays image data.

Various devices and methods understood with reference to the block diagram and circuit diagram illustrated in FIG. 2 or derived from the above description fall within the scope of the present disclosure, and the present disclosure is not limited to any specific configuration. Hereinafter, more specific configuration examples and embodiments will be described in order not to narrow the scope of the present disclosure but to help understanding of the essence and operation of the disclosure and to provide a clear description of the disclosure.

Next, a description will be given in detail of the visibility detector 340.

Figure 4:
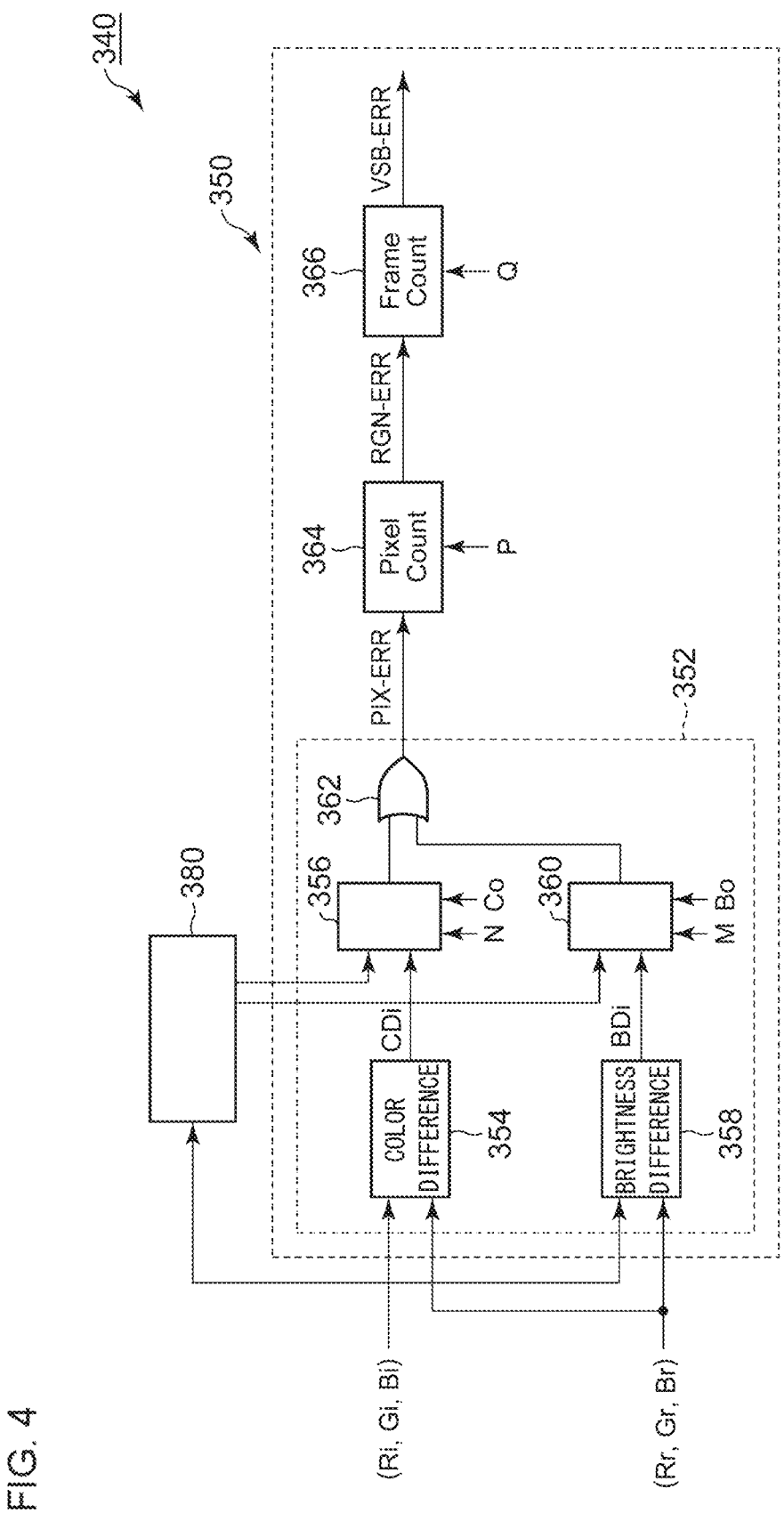
FIG. 4 is a block diagram of a configuration example of a visibility detector.

FIG. 4 is a block diagram of a configuration example of the visibility detector 340.

The determination criterion controller 380 dynamically changes the threshold in a manner that depends on the color of the background of the OSD character 402. According to one embodiment, the determination criterion controller 380 may make the determination criterion less strict as the color of the background is closer to black.

The determiner 350 includes a pixel determiner 352, a region determiner 364, and a final determiner 366. The pixel determiner 352 determines whether the visibility is good or poor for each of the plurality of pixels lying within the target region 404 where the OSD character 402 is drawn, and asserts a pixel error signal PIX_ERR when the visibility is poor.

The region determiner 364 counts the number of pixels having poor visibility, and determines that, when the number of pixels num_err_pix thus counted exceeds a pixel count threshold p, the visibility of the OSD character in the frame is poor, and asserts an RGN_ERR signal. The pixel count threshold p can be obtained as a result of multiplying the total number of pixels (that is, the character size) lying within the target region 404 by a coefficient P. The coefficient P represents an error-allowable ratio. For example, P can be set, via a register, to a value within a range of 0.05% to 62.5%.

The final determiner 366 asserts a final error VSB_ERR when the RGN_ERR signal is continuously asserted over a predetermined number of frames Q. For example, Q can be set, via a register, to a value within a range of 0 to 15.

The determination criterion controller 380 dynamically changes the determination criterion for pixel-by-pixel error detection used by the pixel determiner 352.

The pixel values ($R_i$, $G_i$, $B_i$) of pixels lying within the target region 404 (hereinafter, referred to as a background color) and the reference color ($R_r$, $G_r$, $B_r$) are input to the pixel determiner 352. The reference color ($R_r$, $G_r$, $B_r$) is a color uniquely determined for each OSD character 402. When the OSD character 402 is represented in a single color, the reference color ($R_r$, $G_r$, $B_r$) may be the same as the color of the OSD character 402. When the OSD character 402 is represented in a plurality of colors, the reference color ($R_r$, $G_r$, $B_r$) is determined based on the plurality of colors.

According to the present embodiment, the pixel determiner 352 checks an error based on a color difference $CD_i$ and a brightness difference $BD_i$ between the background color ($R_i$, $G_i$, $B_i$) and the reference color ($R_r$, $G_r$, $B_r$). More specifically, when the color difference $CD_i$ is less than a color difference threshold T or the brightness difference $BD_i$ is less than a brightness difference threshold U, the pixel error PIX_ERR is asserted.

The pixel determiner 352 includes a color difference calculator 354, a color difference error detector 356, a brightness difference calculator 358, a brightness difference error detector 360, and an OR gate 362. The color difference calculator 354 calculates the color difference $CD_i$ based on the following equation (1):

$$CD_i = |R_i - R_r| + |G_i - G_r| + |B_i - B_r| \qquad (1).$$

The color difference error detector 356 compares the color difference $CD_i$ with the color difference threshold T, and determines that, when $CD_i < T$, a result of the comparison indicates an error and outputs HIGH.

The brightness difference calculator 358 calculates the brightness difference $BD_i$ based on the following equation (2):

$$BD_i = |R_i - R_r| * 0.299 + |G_i - G_r| * 0.587 + |B_i - B_r| * 0.114 \qquad (2).$$

The brightness difference error detector 360 compares the brightness difference $BD_i$ with the brightness difference threshold U, and determines that, when $BD_i < U$, a result of the comparison indicates an error and outputs HIGH.

The determination criterion controller 380 changes, on a pixel-by-pixel basis, the determination criterion, that is, the thresholds T, U, used by the color difference error detector 356 and the brightness difference error detector 360. Specifically, when ($R_i$, $G_i$, $B_i$) satisfies the following determination condition, ($R_i$, $G_i$, $B_i$) is determined to be close to black, and the thresholds T, U are reduced.

$$R_i \leq 16 * S, \text{ and}$$

$$G_i \leq 16 * S, \text{ and}$$

$$B_i \leq 16 * S$$

where S represents a black determination threshold and can be set, via a register, to a value within a range of 0 to 15. The closer S is to zero, the narrower the black range is.

The color difference threshold T used by the color difference error detector 356 may be changed using two values $T_1$, $T_2$.

$$T_1 = 32*N$$

$$T_2 = 32*(N-Co)$$

where N represents a set value set, via a register, to a value within a range of 0 to 15. Co represents an offset value set, via a register, to a value within a range of 0 to 3.

When the determination criterion controller 380 determines that the background is black, the color difference threshold $T_2$ is selected to make the determination criterion less strict. When the determination criterion controller 380 determines that the background is not black, the color difference threshold $T_1$ is selected to make the determination criterion stricter.

Likewise, the threshold U used by the brightness difference error detector 360 may be changed using two values $U_1$, $U_2$.

$$U_1 = 32*M$$

$$U_2 = 32*(M-Bo)$$

M represents a set value set, via a register, to a value within range of 0 to 15. Bo represents an offset value set, via a register, to a value within a range 0 to 3.

When the determination criterion controller 380 determines that the background is black, the brightness difference threshold $U_2$ is selected to make the determination criterion less strict. When the determination criterion controller 380 determines that the background is not black, the brightness difference threshold $U_1$ is selected to make the determination criterion stricter.

Figure 5A:
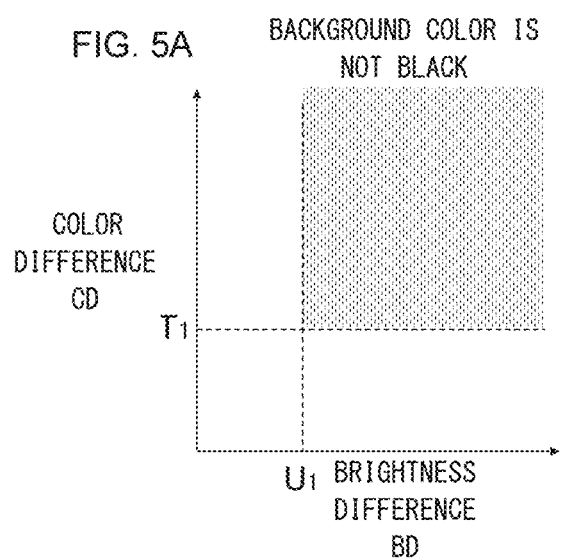
FIG. 5A and FIG. 5B are diagrams for describing how to control a determination criterion.
Figure 5B:
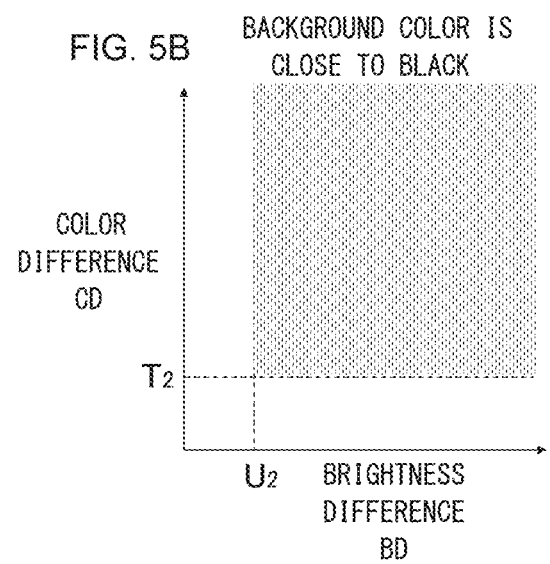

FIG. 5A and FIG. 5B are diagrams for describing how to control the determination criterion. FIG. 5A illustrates a state where the background color is determined not to be black by the determination criterion controller 380. The hatched region is a region where the visibility is high, and the other region is an error region.

FIG. 5B illustrates a state where the background color is determined to be black by the determination criterion controller 380. It is shown that a hatched region having high visibility is increased in area, and the determination criterion is made less strict accordingly.

Figure 6A:
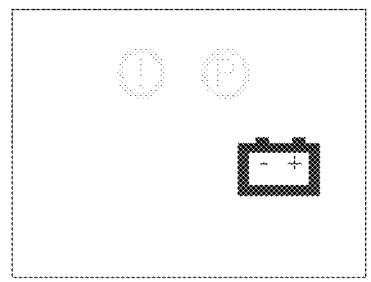
FIG. 6A and FIG. 6B are diagrams illustrating screens where yellow and red OSD characters are displayed on a white background and a black background.
Figure 6B:
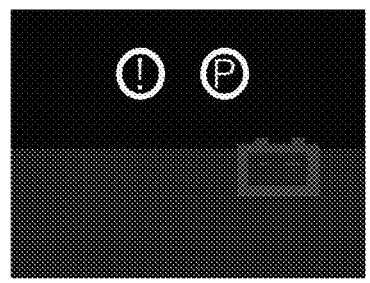

FIG. 6A and FIG. 6B are diagrams illustrating screens where yellow and red OSD characters are displayed on a white background and a black background. The screens are illustrated in gray scale, it is therefore difficult to recognize the color in comparison between FIG. 6A and FIG. 6B, but human eyes have characteristics that the color is easily recognized on the black background and the color is difficult to be recognized on the white background. The semiconductor device 300 according to the embodiment allows visibility detection suitable for human visual characteristics.

Figure 7A:
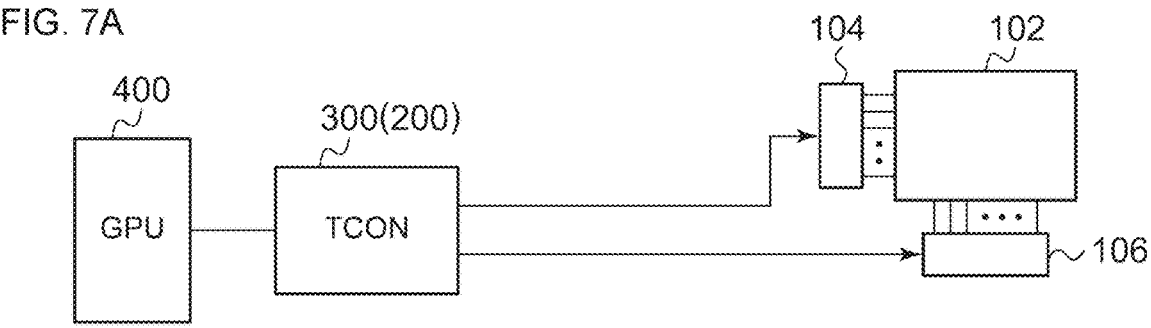
FIG. 7A to FIG. 7D are diagrams illustrating specific applications of the semiconductor device.

Next, a description will be given of an application of the semiconductor device 300. FIG. 7A to FIG. 7D are diagrams illustrating specific applications of the semiconductor device 300. In FIG. 7A, the semiconductor device 300 serves as a timing controller 200. The timing controller 200 receives a digital video signal from the graphic controller 110 and controls a gate driver 104 and a source driver 106.

Figure 7B:
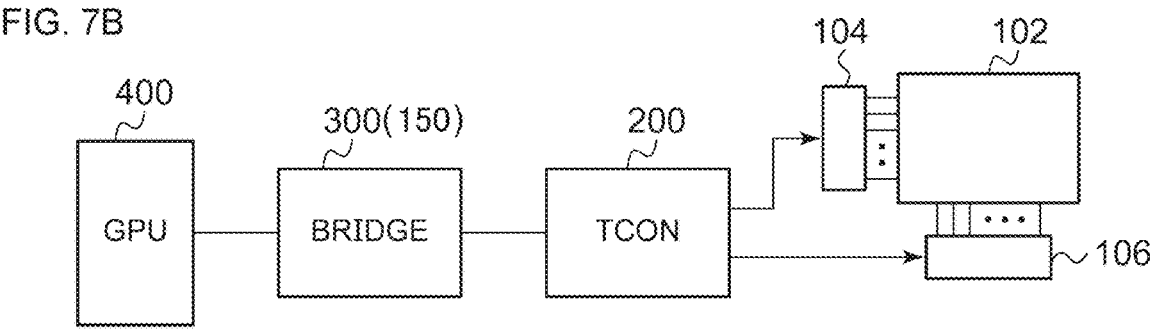

In FIG. 7B, the semiconductor device 300 serves as a bridge chip 150. The bridge chip 150 is provided between the graphic controller 110 and the timing controller 200 and serves as a bridge between an output interface of the graphic controller 110 and an input interface of the timing controller.

Figure 7C:
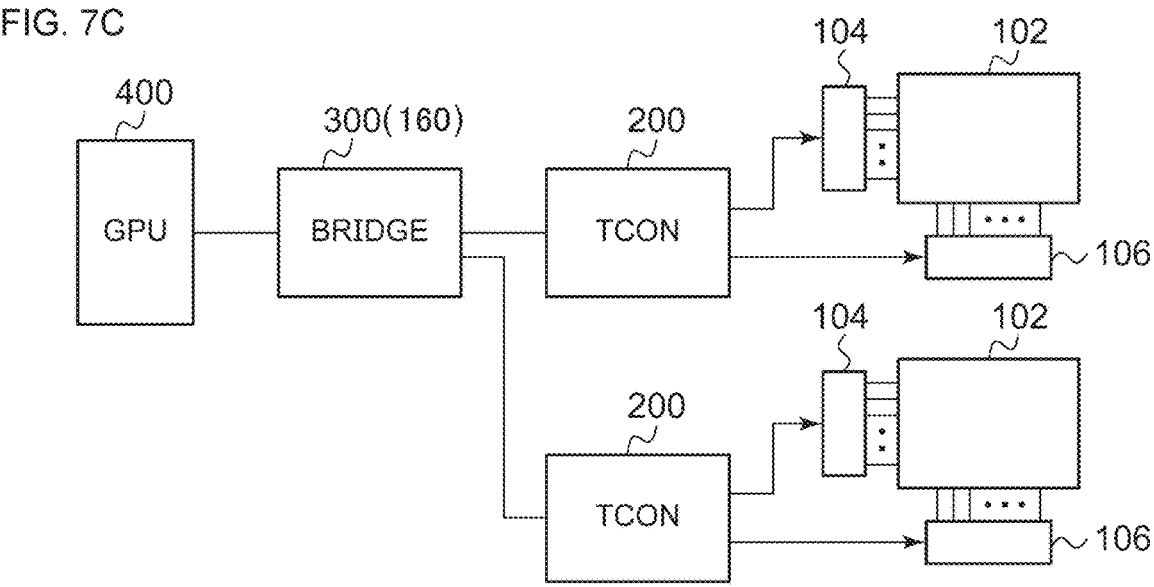

In FIG. 7C, the semiconductor device 300 serves as a bridge chip 160. The bridge chip 160 causes the video signal from the graphic controller 110 to branch to a plurality of systems. The bridge chip 160 may distribute the same video signal as the input video signal to a plurality of systems. Alternatively, the bridge chip 160 may divide the input video signal into a plurality of regions (screens) and distribute the regions to a plurality of systems.

Figure 7D:
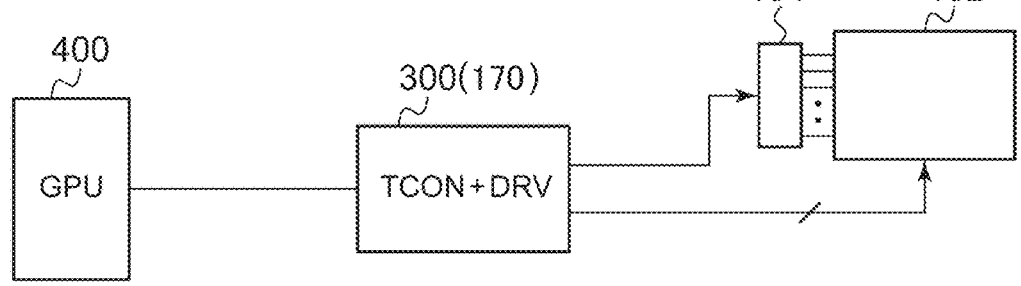

In FIG. 7D, the semiconductor device 300 serves as a one-chip driver 170. The one-chip driver 170 is capable of acting as a timing controller and a display driver (source driver).

Each of the image display systems illustrated in FIG. 7A to FIG. 7D is applicable to various display devices including an on-vehicle display, a medical display, a television, and a PC display. Alternatively, the image display system may be built in an electronic device such as a laptop computer, a tablet terminal, a smartphone, a digital camera, or a digital video camera.

Figure 8A:
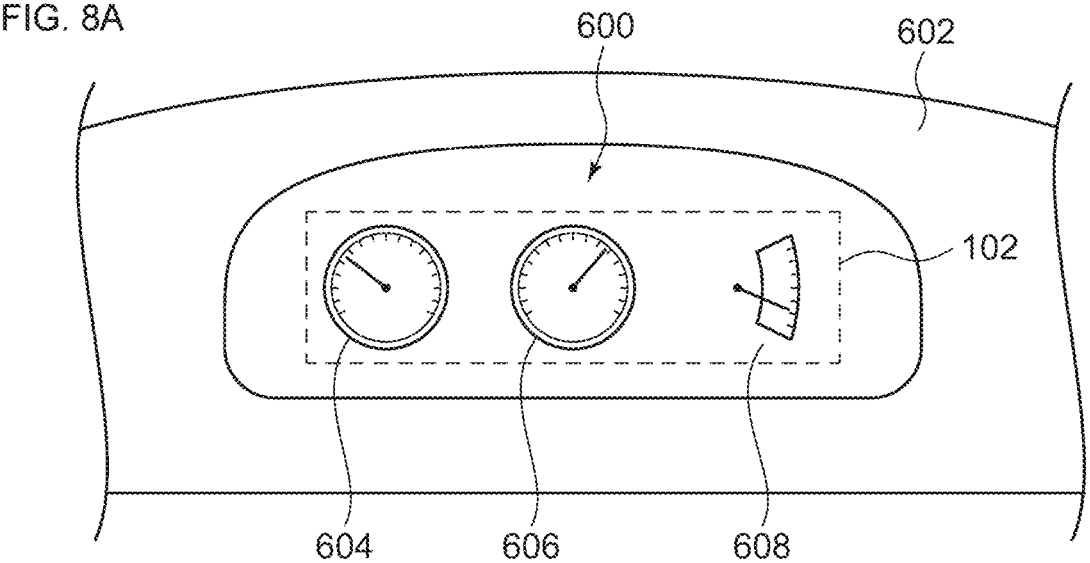
FIG. 8A to FIG. 8C are diagrams illustrating an on-vehicle display device according to an embodiment.

FIG. 8A is a diagram illustrating an on-vehicle display device 600 according to an embodiment. The on-vehicle display device 600 is embedded in a console 602 provided in front of a cockpit, receives, from a vehicle-side processor, a digital video signal (video data) $S_1$ including a speedometer 604, a tachometer 606 indicating a rotation speed of an engine, an amount of remaining fuel 608, and a remaining battery power for a hybrid vehicle or an electric vehicle, and displays the digital video signal $S_1$ (FIG. 8A).

Figure 8B:
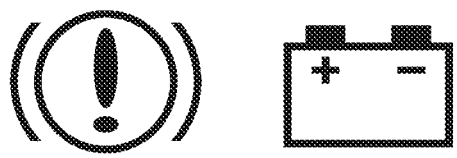

Conventionally, as illustrated in FIG. 8B, an indicator or warning light (hereinafter, simply referred to as a warning light) indicating some abnormality or battery charging problem is displayed outside the display panel by using an independent LED. The reason why the warning light is not displayed on the display panel is as follows. That is, the semiconductor device 300 (the timing controller 200) and the graphic controller 110 are connected to each other via a differential serial interface, and image data cannot be transmitted during a period from the start of the system until the establishment of the serial interface link between the timing controller 200 and the graphic controller 110, so that an image cannot be displayed on the display panel 102. Alternatively, after the link establishment, when the link is interrupted due to noise or the like, an image cannot be displayed on the display panel 102 until the link is established again. The same applies to a case where a cable is disconnected or broken, and a case where the serial interface or a part of the graphic controller 110 is in failure. A state where an image cannot be displayed as described above is referred to as a "non-displayable state".

Since the warning light includes important information to be notified to a driver, it is required that the warning light can be turned on even in the non-displayable state. Under such circumstances, it is necessary to provide the warning light outside the display panel.

On the other hand, the warning light can be displayed on the display panel by the OSD function using another form of the timing controller 200 or the semiconductor device 300 according to the embodiment. This is because the display of the OSD does not require communication via the differential serial interface. This eliminates the need for an LED and a drive circuit of the LED, so that the cost can be reduced. Further, a standard function of the ECU such as $I^2C$ can be used, so that the cost can be further reduced.

Figure 8C:
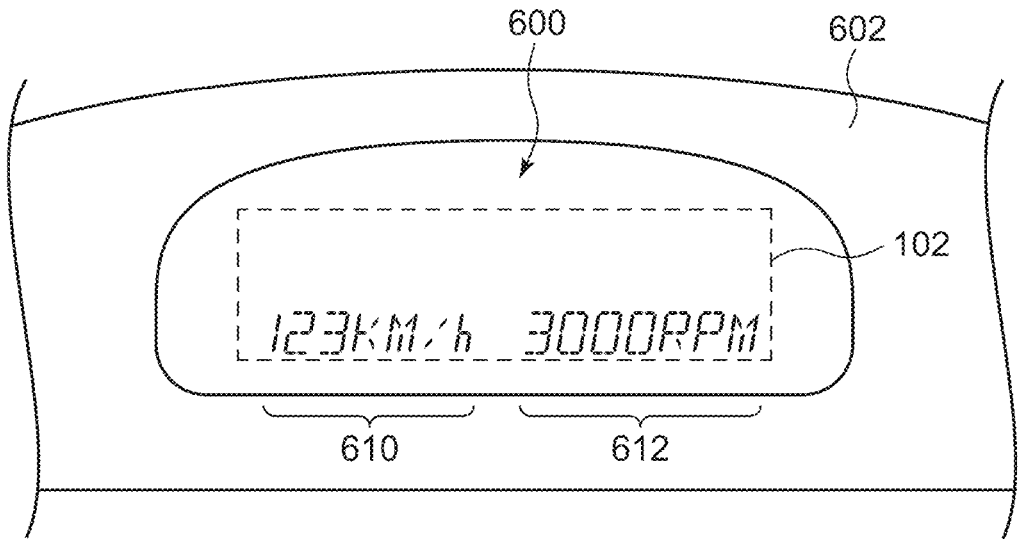

Further, when a situation (non-displayable state) where the video data $S_1$ cannot be displayed occurs in the on-vehicle display device 600, the display panel 102 blacks out, which hinders driving. Therefore, numbers, alphabets, and the like may be prepared as OSD characters. As illustrated in FIG. 8C, when some abnormality occurs during traveling to make the speedometer 604 or the tachometer 606 non-displayable, it is possible to display vehicle speed information 610 and engine speed information 612 in real time by using the OSD function, thereby allowing an increase in safety.

Alternatively, when the ignition of a vehicle is switched on and the on-vehicle display device 600 is put into operation, a character string such as "PLEASE WAIT . . . " or the current time can be displayed by using the OSD function until the video data $S_1$ can be displayed.

The timing controller 200 that is one form of the semiconductor device 300 is applicable to a medical display device. The medical display device displays information necessary for a doctor or a nurse during examination, treatment, or surgery. In the medical display device, even in a situation where the video data $S_1$ cannot be displayed, important information (for example, heart rate, blood pressure, and the like of a patient) can be displayed by using the OSD function.

Figure 9:
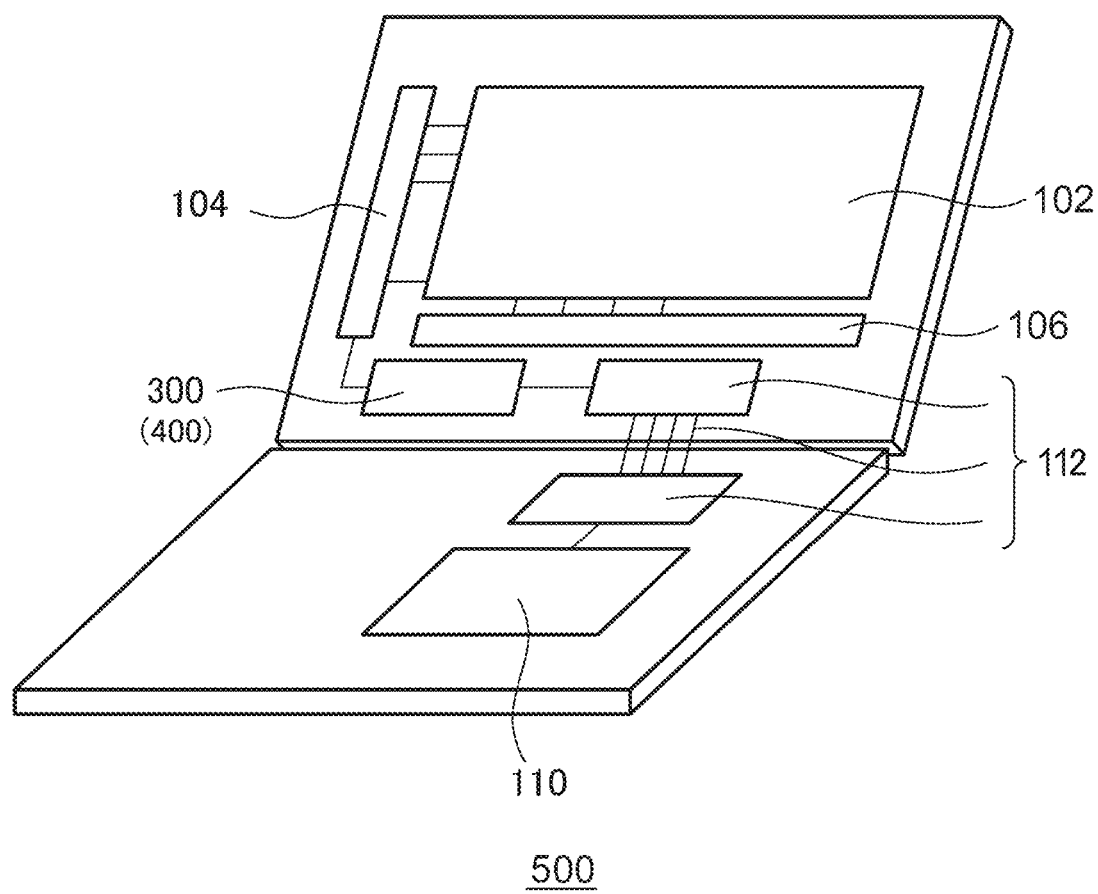
FIG. 9 is a perspective view of an electronic device.

FIG. 9 is a perspective view of an electronic device 500. The electronic device 500 illustrated in FIG. 9 may be a laptop computer, a tablet terminal, a smartphone, a portable game console, an audio player, or the like. The electronic device 500 includes the graphic controller 110, the display panel 102, the gate driver 104, and the source driver 106, all contained in a casing 502. A transmitter 112 including a differential transmitter, a transmission channel, and a differential receiver may be provided between the timing controller 200 and the graphic controller 110.

The present disclosure has been described based on the embodiments. It is to be understood by those skilled in the art that the embodiments are illustrative and that various modifications are possible for a combination of components or processes, and that such modifications are also within the scope of the present disclosure. Next, a description will be given of such modifications.

First Modification

In the visibility detector 340 illustrated in FIG. 4, only either the color difference threshold T or the brightness difference threshold U may be changed.

Second Modification

According to the embodiment, the determination threshold is changed by using two values, but may be changed by using more values.

Third Modification

The determination criterion controller 380 may calculate the brightness or luminance of the background instead of the determination as to whether the background color is black, and may make the determination criterion less strict as the brightness or luminance is lower.

Fourth Modification

In FIG. 4, the parameter P used by the region determiner 364, that is, the threshold of the number of pixels, and the parameter Q used by the final determiner 366, that is, the threshold of the number of frames, may be changed based on the result of the determination made by the determination criterion controller 380.

Fourth Modification

Although the determination criterion controller 380 controls the determination criterion focusing on the background color, the present disclosure is not limited to such a configuration. For example, the finer the background, that is, the higher the spatial frequency of the target region, the lower the visibility of the OSD character displayed on the background. Therefore, the determination criterion controller 380 may change the determination criterion based on the spatial frequency of the target region 404.

Fifth Modification

The determination method implemented by the determiner 350 is not limited to the method described in the embodiments. For example, the determination may be made based on only the color difference or only the brightness difference. Alternatively, instead of or in addition to the color difference and the brightness difference, the determination may be made based on a contrast.

Fifth Modification

The pixel determiner 352 may make the determination on all pixels lying within the target region 404, but the present disclosure is not limited to such a configuration. The OSD character 402 includes opaque effective pixels and transparent ineffective pixels as described above. The pixel determiner 352 may exclude the effective pixels from the determination and make only the ineffective pixels subject to the determination.

Although the present disclosure has been described using specific phrases based on the embodiments, the embodiments merely illustrate the principle and application of the present disclosure, and many modifications and changes in arrangement can be made to the embodiments without departing from the spirit of the present disclosure recited in claims.

What is claimed is:
1. A semiconductor device comprising:
a video input interface structured to receive video data;
an on screen display (OSD) circuit structured to draw an OSD character on a target region of the video data; and
a visibility detector structured to check whether visibility of the OSD character is good or poor,
wherein the visibility detector determines whether the visibility is good or poor for each of a plurality of pixels lying within the target region, and
wherein when the number of pixels having poor visibility exceeds a pixel count threshold p, the visibility of the OSD character is determined to be poor,
wherein the visibility detector is structured to, for each of a plurality of background pixels included in the target region, calculate color difference between a reference color based on the color of the OSD character and a background color which is a pixel value of each background pixel, to count the number of background pixels having the color difference which is smaller than a threshold T, and to determine the visibility of the OSD character is poor when the counted number of background pixels is larger than the pixel count threshold p, and
wherein the threshold T for each of the background pixels is determined according to the pixel value of the background pixel.

2. The semiconductor device according to claim 1, wherein
at least either the color difference threshold or the brightness difference threshold dynamically changes in a manner that depends on a spatial frequency of the target region.

3. The semiconductor device according to claim 1, serving as a timing controller.

4. The semiconductor device according to claim 1, serving as a one-chip driver capable of acting as a timing controller and a source driver.

5. The semiconductor device according to claim 1, serving as a bridge circuit having an M input and an N output, where M≥1, and N≥1.

6. An on-vehicle display system comprising a semiconductor device according to claim 1.

7. An electronic device comprising the semiconductor device according to claim 1.

8. A semiconductor device comprising:
a video input interface structured to receive video data;
an on screen display (OSD) circuit structured to draw an OSD character on a target region of the video data; and
a visibility detector structured to check whether visibility of the OSD character is good or poor, wherein
the visibility detector determines whether the visibility is good or poor for each of a plurality of pixels lying within the target region,
wherein when the number of pixels having poor visibility exceeds a pixel count threshold p, the visibility of the OSD character is determined to be poor,
wherein the visibility detector is structured to, for each of a plurality of background pixels included in the target region, calculate color difference between a reference color based on the color of the OSD character and a background color which is a pixel value of each background pixel, to count the number of background pixels having the color difference which is smaller than a threshold T, and to determine the visibility of the OSD character is poor when the counted number of background pixels is larger than the pixel count threshold p, and
wherein the threshold T for each of the background pixels is determined according to the pixel value of the background pixel.

9. The semiconductor device according to claim 8, wherein at least either the color difference threshold or the brightness difference threshold dynamically changes in a manner that depends on a spatial frequency of the target region.

10. A semiconductor device comprising:
a video input interface structured to receive video data;
an on screen display (OSD) circuit structured to draw an OSD character on a target region of the video data; and
a visibility detector structured to check whether visibility of the OSD character is good or poor,
wherein the visibility detector determines whether the visibility is good or poor for each of a plurality of pixels lying within the target region, and
wherein when the number of pixels having poor visibility exceeds a pixel count threshold p, the visibility of the OSD character is determined to be poor,
wherein the visibility detector is structured to, for each of a plurality of background pixels included in the target region, calculate color difference between a reference color based on the color of the OSD character and a background color which is a pixel value of each background pixel, to count the number of background pixels having the color difference which is smaller than a threshold T, and to determine the visibility of the OSD character is poor when the counted number of background pixels is larger than the pixel count threshold p,
wherein the threshold T for each of the background pixels is determined according to the pixel value of the background pixel, and
wherein the pixel count threshold p is larger as the color of the background pixel is close to black.

11. A semiconductor device comprising:
a video input interface structured to receive video data;
an on screen display (OSD) circuit structured to draw an OSD character on a target region of the video data; and
a visibility detector structured to check whether visibility of the OSD character is good or poor,
wherein the visibility detector determines whether the visibility is good or poor for each of a plurality of pixels lying within the target region, and
wherein when the number of pixels having poor visibility exceeds a pixel count threshold p, the visibility of the OSD character is determined to be poor,
wherein the visibility detector is structured to, for each of a plurality of background pixels included in the target region, calculate color difference between a reference color based on the color of the OSD character and a background color which is a pixel value of each background pixel, to count the number of background pixels having the color difference which is smaller than a threshold T, and to determine the visibility of the OSD character is poor when the counted number of background pixels is larger than the pixel count threshold p,
wherein the threshold T for each of the background pixels is determined according to the pixel value of the background pixel, and
wherein the pixel count threshold p is larger as the brightness or luminance of the background pixel is lower.

* * * * *